United States Patent [19]
Van Brocklin et al.

[11] 3,983,225
[45] Sept. 28, 1976

[54] RECOVERY OF SULFUR FROM SULFUR DIOXIDE RICH AQUEOUS ABSORBENTS

[75] Inventors: Lester Van Brocklin, Thiells; George E. Hansen, Yonkers, both of N.Y.; Mark A. Kuck, Upper Montclair, N.J.

[73] Assignee: Stauffer Chemical Company, Westport, Conn.

[22] Filed: Apr. 24, 1974

[21] Appl. No.: 463,701

[52] U.S. Cl. ............................. 423/574 R; 210/44
[51] Int. Cl.$^2$ ..................................... C01B 17/04
[58] Field of Search ........... 423/574, 575, 573, 659, 423/571; 210/44, 221

[56] References Cited
UNITED STATES PATENTS

| | | | |
|---|---|---|---|
| 1,578,560 | 3/1926 | Sperr | 423/573 X |
| 1,589,749 | 6/1926 | Fulweiler | 423/573 |
| 1,937,196 | 11/1933 | Gollmar | 423/574 |
| 2,125,190 | 7/1938 | Denig et al. | 423/573 |
| 2,729,543 | 1/1956 | Keller | 423/575 |
| 3,576,738 | 4/1971 | Duffy | 423/571 X |
| 3,725,264 | 4/1973 | Wheeler | 423/571 X |

FOREIGN PATENTS OR APPLICATIONS

| | | | |
|---|---|---|---|
| 1,194,850 | 6/1970 | United Kingdom | 210/44 |

OTHER PUBLICATIONS
Gaudin; A. M., *Flotation*, McGraw Hill Book Co., N.Y. 1957, pp. 17 & 338–341.

*Primary Examiner*—G. O. Peters
*Attorney, Agent, or Firm*—Daniel S. Ortiz

[57] ABSTRACT

The invention is an improved method for regenerating liquid streams which contain sulfur dioxide. The method comprises providing a body of liquid which contains sulfur dioxide having a free space above the surface; forming a mixture of gas bubbles in the liquid by admixing a sufficient amount of gas containing hydrogen sulfide with the liquid to react with the liquid to form sulfur and to provide a sufficient amount of gas bubbles to separate sulfur formed from the body of the liquid by flotation. The method is particularly useful for regenerating aqueous absorbents in cyclic processes for removing sulfur dioxide from gas streams.

A preferred method is to admix a sufficient amount of a gas containing hydrogen sulfide with a whirling mass of aqueous absorbent in the body of aqueous absorbent and passing the mixture through a zone of stationary apertures wherein the size of the gas bubbles in the mixture is reduced and whereby hydrogen sulfide in the gas is reacted with the aqueous absorbent to form sulfur and the sulfur is floated to the surface of the body of absorbent by the rising gas bubbles and recovered.

The absorbent can be substantially regenerated and a major portion of the sulfur separated from the aqueous absorbent by this procedure.

4 Claims, 4 Drawing Figures

RECOVERY OF SULFUR FROM SULFUR DIOXIDE RICH AQUEOUS ABSORBENTS

BACKGROUND OF THE INVENTION

The invention relates to an improved process for reacting liquids containing sulfur dioxide with hydrogen sulfide. In particular, the invention relates to a useful method which can be adapted for carrying out the reaction between an aqueous absorbent which has contacted a sulfur dioxide containing gas stream and hydrogen sulfide. More particularly, the invention relates to a useful method for regenerating a liquid absorbent in a cyclic process for removing sulfur dioxide from gas streams.

The combustion of sulfur containing carbonaceous fuel such as fuel oil, fuel gas, petroleum coke, or coal, the production of sulfuric acid, the production of sulfur from hydrogen sulfide and other processes produce effluent gases containing small amounts of sulfur dioxide. Discharge of sulfur-containing effluent gases to the atmosphere constitutes a serious hazard to animal and plant life. The sulfur dioxide content of the effluent gas is quite small and usually below about 0.5 to 2% by volume. However, the volume of the gas produced is so large that considerable amounts of sulfur dioxide are introduced into the atmosphere. In view of the large number of processes which introduce sulfur dioxide into the atmosphere, it is readily apparent that means for removing sulfur dioxide from the waste gases are necessary.

Many processes have been proposed for removing sulfur dioxide from gas streams. In one particularly useful, continuous cyclic process, the sulfur dioxide containing gas stream is contacted with an aqueous liquid absorbent which selectively absorbs the major portion of the sulfur dioxide from the gas stream. The more or less sulfur dioxide free gas stream is discharged to the atmosphere or otherwise disposed of. The absorbent after contact with the sulfur dioxide containing gas stream is passed through a regeneration zone where the absorbent is contacted with hydrogen sulfide. The hydrogen sulfide reacts with the absorbent to form sulfur and regenerate the absorbent. The sulfur is separated from the regenerated absorbent and regenerated absorbent is returned to the absorption zone to contact additional sulfur dioxide containing gas to absorb sulfur dioxide.

The absorption processes are capable of substantially reducing the sulfur dioxide concentration of gas streams containing varying amounts of sulfur dioxide. The processes utilize hydrogen sulfide which is frequently available as a waste product. The major portion of the sulfur dioxide removed from the gas stream is converted to sulfur.

Cyclic processes for removing sulfur dioxide from gas streams are disclosed in United States Pat. Nos. 2,563,437 and 2,729,543. The aqueous absorbent for absorbing sulfur dioxide from gas streams is usually water or solutions of alkali metal salts of non-volatile acids which have at least one dissociation constant of between about $1 \times 10^{-2}$ and $1 \times 10^{-5}$, measured at a dilution of 40 liters per gram mole at a temperature of 25°C. Aqueous solutions of non-volatile acids such as lactic acid, glycolic acid, succinic acid, tartaric acid, oxalic acid, diglycolic acid, citric acid, solutions of certain water soluble aluminum salts, beryllium salts, boron salts and alkali metal phosphates and solutions of certain organic solvents and the like have been found useful in cyclic processes. Absorbent solutions in a pH range of about 2.5 to about 5.0 can be effectively used in the processes.

One difficulty in operation of a continuous process for removing sulfur dioxide from gas streams involves contact and reaction of hydrogen sulfide with the absorbent which has contacted the sulfur dioxide containing gas stream. The hydrogen sulfide is relatively insoluble in the aqueous absorbents at the relatively low pH utilized in the processes. In addition, the reaction of hydrogen sulfide with certain species in the sulfur dioxide rich aqueous absorbent leads to formation of undesirable by-product species. The by-product species can be reacted with hydrogen sulfide to form sulfur but tend to react slowly, buildup in the aqueous absorbent and adversely affect the absorption of sulfur dioxide.

The principal object of the present invention is to provide a method whereby an aqueous liquid containing sulfur dioxide can be rapidly reacted with gaseous hydrogen sulfide to form sulfur and the sulfur readily separated from the aqueous liquid. Another object of the present invention is to provide a continuous method for reacting a sulfur dioxide containing aqueous absorbent with hydrogen sulfide in a manner in which the sulfur formed is separated from the main body of the aqueous absorbent in one operation. It is a further object of the present invention to combine the sulfur dioxide-hydrogen sulfide reactor and sulfur separation into one operation thereby reducing energy and other operating requirements to provide an abatement process which can operate continuously with a minimum of operating problems and without undesirable chemical effects on the system.

BRIEF SUMMARY OF THE INVENTION

In accordance with the present invention a gaseous mixture containing hydrogen sulfide is dispersed in the form of bubbles, in a zone of liquid enriched in sulfur dioxide, in an amount sufficient to react with sulfur dioxide to form sulfur and to float the sulfur to the surface of the body of liquid. The sulfur dioxide can be partially reacted or substantially reacted from the aqueous liquid. The method is preferably utilized to react with sulfur dioxide in aqueous absorbents. The aqueous absorbents can be partially or preferably substantially regenerated by the method.

The gas containing hydrogen sulfide can be dispersed in the form of bubbles in the body of absorbent by any suitable method and means for dispersing gases in liquids. The fine bubbles provide intimate contact between the gas containing hydrogen sulfide and the aqueous absorbent for the reaction with the sulfur dioxide to form sulfur and the bubbles provide a vehicle for floating the sulfur formed to the surface of the liquid absorbent.

In a preferred embodiment of the invention we provide a zone containing aqueous absorbent in the lower portion thereof and void or free space in the upper portion. Gas bubbles are dispersed in the aqueous absorbent by passing a gaseous mixture containing hydrogen sulfide into a circulating zone of aqueous absorbent thereby forming a gas/liquid mixture. The mixture is passed through a zone of stationary apertures wherein the size of the gas bubbles in the mixture is reduced and whereby hydrogen sulfide in the gas is contacted with the aqueous absorbent to form sulfur. The sulfur is floated to the surface of the absorbent by the rising gas bubbles and recovered. The aqueous absorbent is preferably provided with mechanically operated means for providing a whirling mass of aqueous absorbent for admixture with the hydrogen sulfide containing gas.

The process is particularly useful when two or more reaction-flotation zones are provided for operation countercurrently in series to reduce the amount of free sulfur in the regenerated aqueous liquid and to substantially reduce the amount of unreacted hydrogen sulfide in the gas stream leaving the reaction-flotation zone. Two or more reaction-flotation zones can also be operated cocurrently in series.

DETAILED DESCRIPTION OF THE INVENTION

The process of the present invention is useful for reacting hydrogen sulfide with a sulfur dioxide rich aqueous liquid and separating the sulfur formed, in one step. The sulfur dioxide containing aqueous liquid can arise from many sources. The process can be effectively utilized to reduce the sulfur dioxide content and the sulfur formed by reaction of hydrogen sulfide with the sulfur dioxide rich aqueous liquid in one step in a once-through or cyclic process sulfur dioxide absorption process.

In a once-through process, the aqueous absorbent is utilized only one time to contact the sulfur dioxide containing gas stream. Water is the preferred absorbent in the once-through process. Water is used to absorb the sulfur dioxide from the gas stream and the water is discarded after the sulfur dioxide is reacted to sulfur and the sulfur is separated from the water. The sulfur dioxide and sulfur content of the water must be reduced to relatively low levels to permit the water to be discarded without undue pollution to the environment. By proper operation of the process of the present invention, the free sulfur content of the aqueous absorbent can be reduced to levels below about 100 parts per million.

In certain processes it may be desirable to only partially react the sulfur dioxide to sulfur. The present process is useful in this type of process.

The process of the present invention is particularly useful for regenerating the aqueous absorbent in a continuous cyclic process for removing sulfur dioxide from gas streams. In a continuous cyclic process for removing sulfur dioxide from a gas stream, a gas stream containing sulfur dioxide is contacted with an aqueous absorbent in an absorption zone. The concentration of sulfur dioxide in the gas stream is reduced as the gas stream passes through the absorption zone. The concentration of sulfur dioxide in the aqueous absorbent increases as the absorbent passes through the absorption zone. As used herein, the absorbent which leaves the absorption zone is noted as sulfur dioxide rich absorbent. Sulfur dioxide rich absorbents usually contain from about 0.5 to 30 grams of sulfur dioxide per liter of solution. The major portion of the sulfur dioxide in the absorbent is usually present in the form of reactive species such as bisulfite ($HSO_3^-$). However, under cyclic operating conditions reactive species such as thiosulfate ($S_2O_3^=$) and polythionate ($S_xO_6^=$ where $x$ is from 3 to about 6) enter into the complex reaction chemistry involved in regenerating the absorbent. As reported herein sulfur dioxide in the liquid absorbent is determined by the West-Gaeke Colormetric procedure.

The sulfur dioxide rich absorbent is then contacted with hydrogen sulfide to react with the absorbent to form sulfur and to regenerate the absorbent. The aqueous absorbent which has been contacted with hydrogen sulfide and has had the concentration of sulfur dioxide substantially reduced is here noted as regenerated absorbent.

The sulfur formed by the reaction of hydrogen sulfide with the absorbent is separated from the absorbent. The process of the present invention separates the sulfur from the aqueous absorbent by the flotation action of the bubbles formed in the reaction-flotation zone. In a cyclic process, the regenerated absorbent is utilized as feed to the absorption zone.

The continuous cyclic processes usually do not require that the sulfur dioxide be completely eliminated from the regenerated absorbent. The process does, however, require that the sulfur dioxide concentration in the regenerated absorbent be sufficiently low that the sulfur dioxide concentration in the gas stream can be reduced to the required level in the absorption zone. The regenerated absorbents, preferably contain less than about 0.09 grams/liter sulfur dioxide. It is possible to provide a regenerated absorbent containing less than 0.06 grams/liter sulfur dioxide. Regenerated absorbents containing less than about 0.06 grams/liter sulfur dioxide permit the removal of sulfur dioxide from gas streams to a level of less than 100 parts per million by volume.

The sulfur froth recovered from the flotation-reactor zone usually contains from about 3 to about 20 percent sulfur by weight. The sulfur is usually separated from the absorbent. The sulfur can be separated from the absorbent by methods for separating sulfur from liquids such as filtration, heating under elevated pressure to melt the sulfur and form an aqueous layer and a molten sulfur layer and the like.

In operation of a continuous cyclic process under more or less constant liquid flow, gas flow and composition conditions, the regenerated aqueous absorbent entering the absorption zone is of a composition which is characteristic of the particular absorbent solution and its concentration. The sulfur dioxide rich absorbent leaving the absorption zone also is of a composition characteristic of the particular absorbent solution and its concentration. Substantial regeneration of the aqueous absorbent requires that the reaction between the hydrogen sulfide and the sulfur dioxide rich absorbent provide a regenerated absorbent, for feeding to the absorption zone, with the characteristic composition. Major changes in the composition of the regenerated absorbent entering the absorption zone indicates that substantial regeneration of the absorbent has not been achieved. Minor changes in regenerated absorbent compositions are not unusual, and indicates small deficiencies in reaction of hydrogen sulfide, or minor deficiencies in process operation.

The process of the present invention is particularly effective for regenerating aqueous absorbents such as water or solutions of one or more salts of substantially non-volatile acids with at least one dissociation constant between about $1 \times 10^{-1}$ and $1 \times 10^{-5}$ measured at a dilution of 40 liters per gram mole at a temperature of 25°C. Other acid salts and aqueous solutions of certain organic compositions can also be utilized.

The quantity of acid anion should be in such proportion to maintain the sulfur dioxide rich aqueous absorbent in a pH range of between about 2.5 to 5.0 and preferably, between about 3.0 and about 4.5. The cation is usually an alkali metal, ammonium, alkaline earth metal or certain other basic radicals which form water soluble salts with acids. Solutions of alkali metal or ammonium salts of orthophosphoric acid, citric acid, and succinic acid and aluminum sulfate are particularly effective in cyclic absorption processes. The amount of basic radical in the solution must be adjusted to maintain the pH of the sulfur dioxide rich absorbent between about 2.5 and 5.0.

The process of the present invention is an improved one-step method for reacting hydrogen sulfide with the sulfur dioxide rich aqueous absorbent and separating the sulfur formed from the aqueous absorbent.

The reaction between the hydrogen sulfide and sulfur dioxide rich absorbent and separation of the sulfur from the body of the aqueous absorbent is achieved by admixing a gas containing hydrogen sulfide in the form of small bubbles with the absorbent and permitting the hydrogen sulfide to contact the absorbent to form sulfur and the bubbles to float the sulfur to the surface of the absorbent where it may be collected and processed further to separate the absorbent which is intermixed with the sulfur froth.

In a preferred embodiment the reaction between the hydrogen sulfide and sulfur dioxide rich absorbent and separation of the sulfur is achieved by admixing a hydrogen sulfide containing gas with a whirling mass of the aqueous absorbent and passing the mixture through stationary apertures or interstices which further reduce the size of the bubbles in the liquid and assure intimate mixture and contacting of the gas bubbles and the aqueous absorbent. Hydrogen sulfide in the gas reacts with the sulfur dioxide in the aqueous absorbent, sulfur forms and the sulfur is carried to the surface of the body of aqueous absorbent by the flotation action of the small bubbles. A sufficient amount of gas must be provided to not only react with the absorbent to form sulfur but also to provide a sufficient amount of residual gas to permit the bubbles to separate the sulfur from the absorbent by flotation. The reaction-flotation can be accomplished by flotation apparatus such as the Wemco Hydrocleaner, the Denver Sub-A flotation machine, the Fagergren flotation machine or the Agitair flotation machine.

The intimate intermixing of the hydrogen sulfide containing gas and sulfur dioxide rich absorbent provided by the flotation machines provides for rapid reaction of the hydrogen sulfide with the sulfur dioxide to form sulfur and separation of the sulfur formed from the aqueous absorbent in a one-step operation. The size of the apparatus necessary to impart the proper intermixing of the aqueous absorbent and the gas containing hydrogen sulfide is dependent upon the size of the zone and the flow rates of material which are to be intermixed. The amount of hydrogen sulfide intermixed with the aqueous absorbent in the reaction-flotation zone decreases as the hydrogen sulfide reacts with the sulfur dioxide to form sulfur. Sufficient hydrogen sulfide or non-reactive gas intermixed with the hydrogen sulfide must be provided to the reaction-flotation zone to provide a sufficient amount of gas to separate the sulfur from the aqueous absorbent by flotation.

If the gas stream is substantially pure hydrogen sulfide, a large excess of hydrogen sulfide over that required to react with the sulfur dioxide in the aqueous absorbent is provided to insure that an adequate amount of bubbles are present to float the sulfur from the aqueous absorbent. The excess hydrogen sulfide can be recirculated through the absorbent. Certain flotation machines are designed to accomplish recirculation of the gas through the aqueous phase without requirements for external gas pumping devices.

In the usual case, however, the hydrogen sulfide utilized in the process is not pure hydrogen sulfide and considerable concentrations of inert and non-reactive gases are present in the gas mixture. Gas mixtures containing as little as 20% by volume hydrogen sulfide are useful in the process of the present invention. The amount of hydrogen sulfide provided should be in excess of that required to substantially eliminate the sulfur dioxide from the aqueous absorbent. Large excesses of hydrogen sulfide are helpful to the process. Excess hydrogen sulfide up to about 10 to 20 times the amount required to react with the sulfur dioxide can be utilized in the process. The minimum amount of gas introduced into the process should contain sufficient hydrogen sulfide to react with the sulfur dioxide in the aqueous absorbent to form sulfur and to provide a sufficient amount of hydrogen sulfide and/or inert and unreactive gases to effect the separation of the sulfur from the aqueous absorbent by flotation.

The reaction between hydrogen sulfide and sulfur dioxide rich aqueous absorbent is extremely rapid. However, the solubility of hydrogen sulfide in the acidic aqueous absorbent is low. The formation of the small bubbles in the aqueous absorbent aids in contacting the hydrogen sulfide with the aqueous absorbent and provides for rapid regeneration of the absorbent.

The process can be operated over a wide range of temperatures. At a pH in the range of about 2.5 to about 5.0, the reaction between the hydrogen sulfide and the sulfur dioxide rich absorbent is rapid over a temperature range of about 75°F. to about 200°F. Higher or lower temperatures can be utilized.

The process of the present invention can be conducted at atmospheric or superatmospheric pressure. It is, however, preferable to operate under superatmospheric pressure to promote the solubility of hydrogen sulfide in the aqueous absorbent.

The process of the present invention is preferably operated in a manner in which the amount of hydrogen sulfide provided for contact with the sulfur dioxide rich absorbent is at least sufficient to substantially regenerate the aqueous absorbent, and provide sufficient excess hydrogen sulfide or inert and non-reactive gases to effect separation of the sulfur from the aqueous absorbent by flotation. Gas streams containing relatively low concentrations of hydrogen sulfide can be used in the process. It is, however, preferred to utilize gas streams containing at least 20% by volume hydrogen sulfide and preferably more than 30% by volume hydrogen sulfide. The aqueous absorbent need not be substantially regenerated to fall within the purview of the present invention.

If gas streams containing substantial amounts of inert gases are utilized in the process of the present invention, it is preferable to utilize two or more reaction-flotation zones in series with the gas stream containing the lowest concentration of hydrogen sulfide contacting the aqueous absorbent containing the highest concentration of sulfur dioxide and the gas stream containing the highest concentration of hydrogen sulfide contacting the aqueous absorbent containing the lowest concentration of sulfur dioxide. Countercurrent operation substantially reduces the concentration of hydrogen sulfide in the gas stream venting from the system. The process can be operated in a manner in which a gas containing only small amounts of unreacted hydrogen sulfide is vented from the system. The process can also be operated in a cocurrent manner.

The use of multiple reaction-flotation units, in series, provides an aqueous absorbent containing only small amounts of precipitated sulfur. It is possible by the use of multiple reaction flotation zones to provide a regenerated aqueous absorbent containing less than about 100 parts per million precipitated sulfur and preferably less than 50 parts per million.

Figure 1:
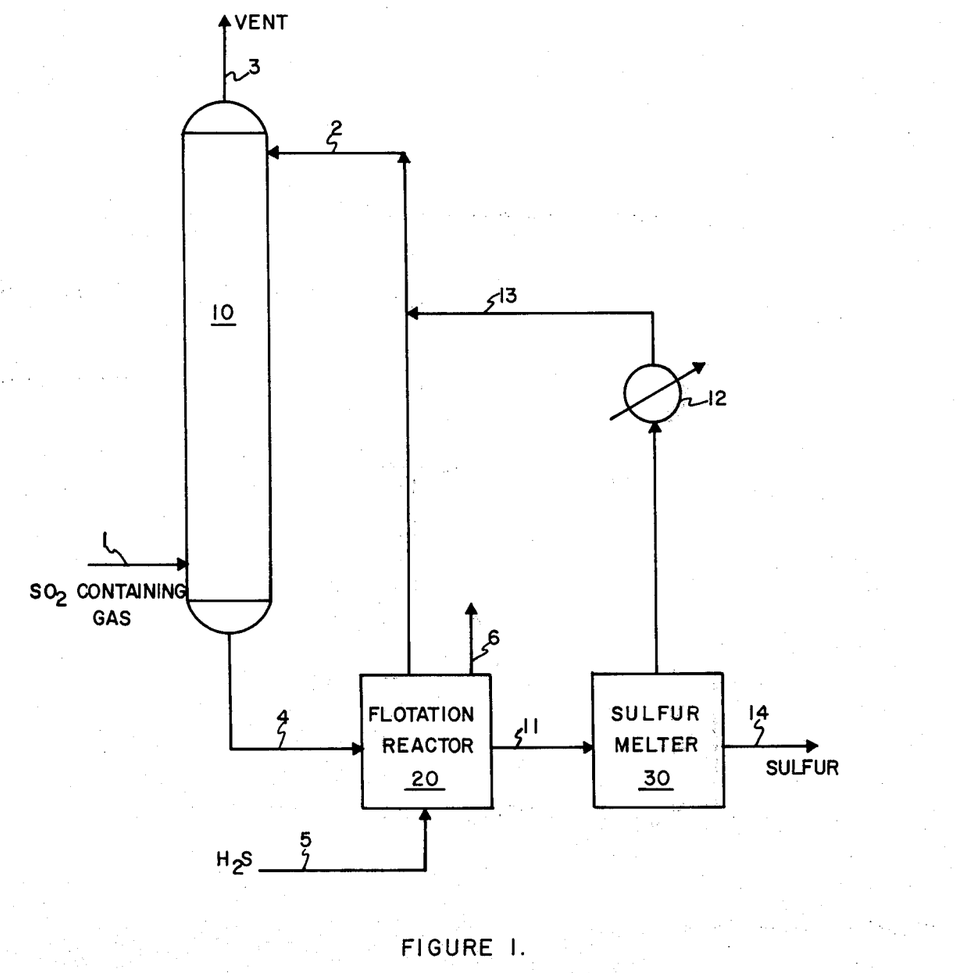
FIG. 1 is a Flow Diagram of a cyclic sulfur dioxide absorption process.

FIG. 1 illustrates an embodiment of the process of the present invention. Sulfur dioxide containing gas enters absorption column 10 through line 1 and is countercurrently contacted with the aqueous absorbent which enters column 10 through line 2. The gas stream having the sulfur dioxide concentration substantially reduced is passed out of the absorption column through vent line 3. The sulfur dioxide rich absorbent passes out of absorption column 10 through line 4 to flotation-reactor 20. Flotation-reactor 20 can be a single flotation-reaction zone, or several flotation-reaction zones in series to provide sufficient holdup time and reaction volume to permit the hydrogen sulfide in the gas stream to react with the aqueous absorbent to form regenerated absorbent and sulfur and to effect separation of the sulfur from the aqueous absorbent.

The gas stream having a substantial portion of the hydrogen sulfide reacted with the sulfur dioxide in the aqueous absorbent is passed out of the system through line 6. If the gas stream contains substantial amounts of unreacted hydrogen sulfide, the gas stream can be passed to means for recovering the hydrogen sulfide from the inert unreacted gases before they are passed to the atmosphere.

The regenerated absorbent is circulated to absorption column 10 through line 2. It may be desirable to include a filter in line 2 to substantially eliminate the small amounts of sulfur which may still be suspeneded in the aqueous absorbent. The flotation-reactor can provide aqueous absorbent streams containing less than about 100 parts per million sulfur.

The sulfur froth which has been floated from the aqueous absorbent passes to sulfur melter 30 through line 11. In sulfur melter 30, which is operated under an elevated pressure, the sulfur froth is melted and the molten sulfur separated from the aqueous absorbent which accompanies the froth. The aqueous absorbent is separated from the molten sulfur, cooled in heat exchanger 12 and passed to the absorption column. The aqueous absorbent from sulfur melter 30 passes through line 13 and mixes with the main stream of recirculating absorbent in line 2. The sulfur leaves the system in the molten form through line 14. The sulfur can be utilized in the molten form or it can be solidified and stored for future use.

Figure 2:
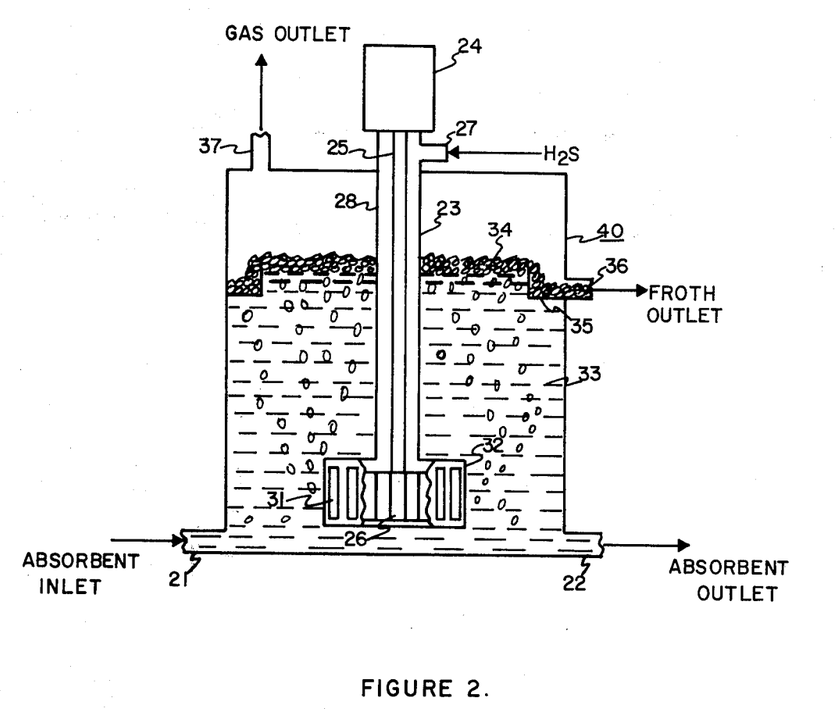
FIG. 2 is an embodiment of a single zone utilizing mechanical means for intermixing small bubbles of gas containing hydrogen sulfide with the absorbent for reaction and sulfur separation.

FIG. 2 is an illustration of a single flotation-reaction zone. Flotation-reaction zone 40 is a vessel having an inlet 21 for admission of the aqueous absorbent to the flotation-reaction zone, and outlet 22 for passing the aqueous absorbent out of the system. The level of the aqueous absorbent in flotation reactor 40 is controlled by level control means in line 22 not shown.

Liquid-gas mixer and bubble producer 23 is placed in flotation-reactor 40. Liquid-gas mixer and bubble producer 23 comprises rotating means 24 which can be an electric motor connected to vertical rotating shaft 25 through a variable speed drive mechanism. Vertical rotating shaft 25 is connected to rotating element 26 which draws aqueous absorbent from the body of liquid in flotation-reactor 40, provides a whirling action to the liquid and admixes the liquid with gas containing hydrogen sulfide. The gas containing hydrogen sulfide enters the shroud 28 about rotating shaft 25 through line 27. The gas flows down around shaft 25 through shroud 28 and enters the agitated area about rotating member 26.

The gas containing hydrogen sulfide and the aqueous absorbent are admixed by the rotating motion of member 26 and are forced through apertures 31 in bubble breaker 32 supported on shroud 28. The shearing forces caused by the gas and liquid passing through apertures 31 in bubble breaker 32 causes the gas bubbles produced by the admixture of the gas and liquid to be broken into smaller bubbles.

Hydrogen sulfide in the gas reacts with the sulfur dioxide in the aqueous absorbent to form sulfur and the sulfur is attracted to the gas bubbles which float up through the body of liquid 33 in flotation reactor 40 and collect as a froth 34 in the free space at the surface of the liquid. The froth overflows into trough 35 and flows out through line 36 to froth collection and treatment means not shown. A mechanical skimmer (not shown) may be positioned to operate near the surface of the liquid to urge the froth into the collection troughs and reduce the amount of froth floating on the absorbent.

The inert and non-reactive gases and any excess hydrogen sulfide pass out of the flotation reactor through line 37. Means are provided in cooperation with line 36 to prevent gas containing hydrogen sulfide from venting to the atmosphere through line 36.

In operation, the sulfur dioxide rich aqueous absorbent enters the flotation-reactor through line 21 and is picked up and admixed with the gas containing hydrogen sulfide by rotating means 26. A mixture of the gas and liquid passes through bubble breaker apertures 31 in bubble breaker 32 to form fine bubbles. The hydrogen sulfide reacts with the sulfur dioxide in the aqueous absorbent to form sulfur and the sulfur is floated in the form of froth to the surface of the liquid in flotation reactor 40. The froth which is removed from the flotation reactor through line 36 can be separated from the aqueous absorbent. The froth usually contains from about 3 to about 25% sulfur by weight and can be further treated to separate the sulfur from the aqueous absorbent. The sulfur can be separated from the aqueous absorbent in the froth by means of vacuum or pressure filters, by heating the froth under pressure to melt the sulfur and form a layer of sulfur which is easily separated from the aqueous absorbent, by the use of solvents or other means for separating sulfur from aqueous liquids.

The aqueous absorbent removed from the flotation reactor 40 through line 22 has had at least a portion of the sulfur dioxide contained therein reacted with hydrogen sulfide to form sulfur and a substantial amount of the sulfur formed has been removed from the aqueous absorbent by the flotation action of the bubbles of unreacted and inert gases.

At low flow rates and low concentrations of sulfur dioxide in the aqueous absorbent, a single flotation-reactor cell can provide adequate regeneration of the absorbent and simultaneously remove a substantial portion of the sulfur from the aqueous absorbent.

Figure 3:
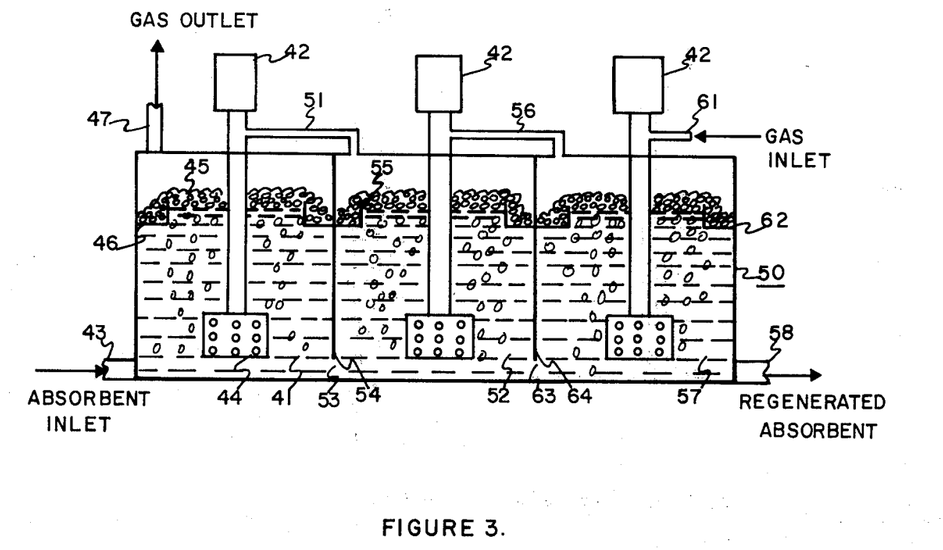
FIG. 3 is an embodiment of three zones operated countercurrently in a series for reaction and sulfur separation.

FIG. 3 illustrates an embodiment of the process of the present invention which utilizes three flotation-reaction zones operating in series. The use of flotation-reaction zones operating countercurrently in series is useful when the concentration of sulfur dioxide in the aqueous absorbent is high or the flow rates of aqueous absorbent are high. The countercurrent flow multiple flotation reactors are also useful when the concentration of hydrogen sulfide in the gas stream is low, permitting substantially all of the hydrogen sulfide to be reacted from the gas stream. The flotation reactor 50 contains three separate stages of flotation-reaction in which the aqueous absorbent is countercurrently contacted with a hydrogen sulfide containing gas stream.

Flotation reactor 50 contains three discrete flotation reaction zones each having a means 42 for admixing the aqueous absorbent with the hydrogen sulfide containing gas stream. The aqueous absorbent enters flotation reactor 50 through line 43 which admits the aqueous sulfur dioxide rich absorbent into the lower portion of first flotation-reactor zone 41. As the aqueous absorbent flows through flotation reaction zone 41 it is admixed with the hydrogen sulfide containing gas stream in mixing and bubble forming zone 44. The hydrogen sulfide in the gas stream and sulfur dioxide in the aqueous absorbent react to form sulfur. The sulfur floated to the surface of flotation reaction zone 41 forms froth 45 which overflows into troughs 46, is collected and removed from the system. Skimming means (not shown) may be provided to aid in collecting the sulfur froth.

The gases leaving the flotation-reaction zone pass out of the system through line 47 to a gas treatment zone (not shown) to insure that undue quantities of hydrogen sulfide are not vented to the atmosphere. Hydrogen sulfide, if any, which remains in the gas can be recovered to absorption techniques or the gas stream can be burned to oxidize the hydrogen sulfide to sulfur dioxide and the sulfur dioxide containing gas stream can be passed to an absorption zone and contacted with an aqueous absorbent for sulfur dioxide.

Hydrogen sulfide containing gas is passed from flotation-reaction zone 52 through line 51 to bubble forming means 42. Bubble forming means 42 can be designed so that a zone of low pressure is formed in the apparatus which permits the gas to flow to flotation-reaction zone 41 from flotation reaction zone 52. Alternatively, gas moving means can be utilized in line 51 to increase the pressure on the hydrogen sulfide containing gas and move it into flotation-reaction zone 41. Design of admixing and bubble forming apparatus are well known in the art. Need for increased pressure to transfer the gas from one flotation reaction zone to another would be considered in the design of the admixing and bubble forming apparatus.

Multiple flotation-reaction zones can also be operated in a manner in which a separate supply of gas is provided to each discrete zone.

The aqueous absorbent which has been contacted with the hydrogen sulfide containing gas and has had at least a portion of the sulfur dioxide reacted with the hydrogen sulfide passes through aperture 53 in wall 54 which separates zone 41 from zone 52. In flotation reaction zone 52, the aqueous absorbent is further contacted with hydrogen sulfide and the sulfur is floated from the body of liquid in zone 52 to form a froth in the void space above the liquid. The froth overflows and is collected in troughs 55. Hydrogen sulfide containing gas enters the bubble forming apparatus 42 through line 56 from the free space above the body of the liquid in flotation-reaction zone 57.

A free space is provided above the surface of the absorbent to permit the gas to disengage from the liquid and to permit the froth to form and collect.

The absorbent flows through aperture 63 in wall 64 into flotation reaction zone 57. The adsorbent is admixed with hydrogen sulfide containing gas in bubble forming means 42. The hydrogen sulfide containing gas enters the bubble forming apparatus 42 in flotation-reaction zone 57 through line 61. The froth containing sulfur overflows the body of liquid flotation reaction zone 57 and is collected in troughs 62 and can be combined with the flotation sulfur from flotation zones 41 and 52 and separated from the aqueous absorbent contained therein. Means for skimming the sulfur froth from the surface of the liquid can be provided to reduce the volume of sulfur froth floating on the surface of the liquid.

The aqueous absorbent which has been regenerated is removed from the flotation-reactor zone 50 through line 58 and recirculated to the absorption zone. A small amount of sulfur may remain in the absorbent. If the absorption zone will be adversely affected by the small amount of sulfur in the liquid absorbent the sulfur can be removed by passing the absorbent through filtering means to substantially eliminate the particulate sulfur from the aqueous absorbent.

By operating flotation-reaction zones in series, it is possible to regenerate the absorbent and remove the particulate sulfur to levels below about 100 ppm.

Figure 4:
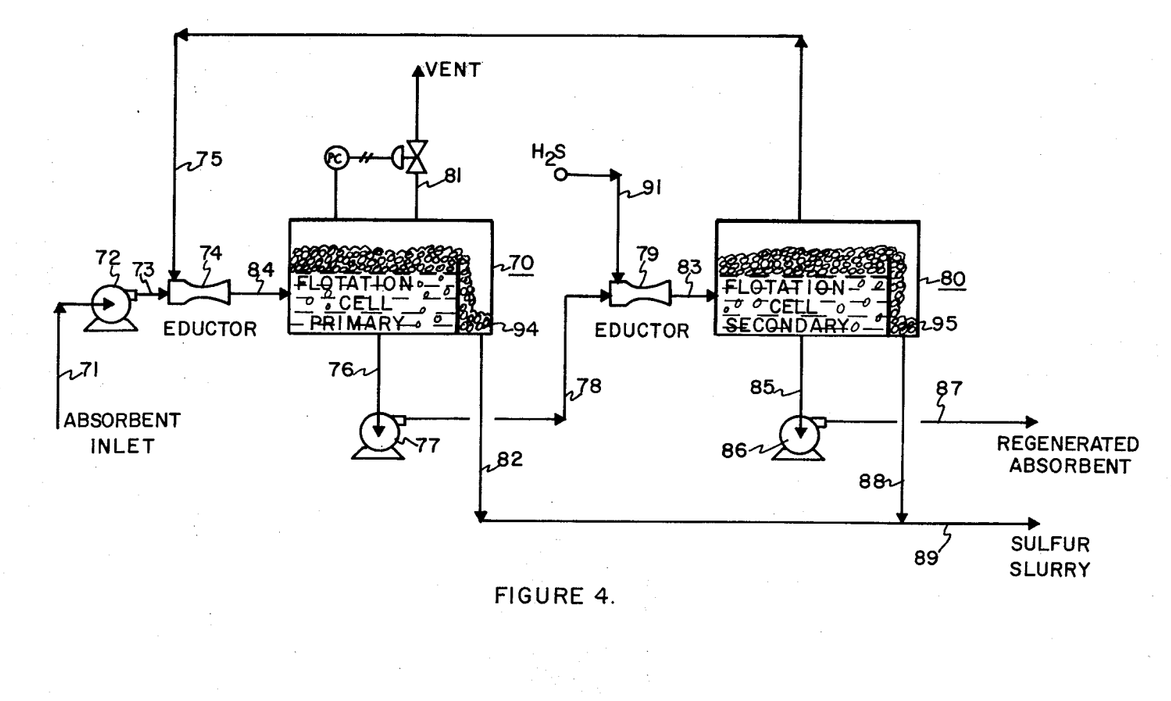
FIG. 4 is an embodiment illustrating two zones operating in series utilizing a venturi or eductor for intermixing bubbles of gas containing hydrogen sulfide with the absorbent for reaction and sulfur separation.

FIG. 4 is an illustration of two flotation-reaction zones operating countercurrently in series utilizing venturi type educators to provide the intimate intermixing of the absorbent and gas bubbles.

Sulfur dioxide rich absorbent from the absorption zone passes through line 71 to pump 72. Pump 72 causes the liquid to flow through eductor 74 and mix with hydrogen sulfide containing gas passing from flotation-reaction zone 80 through line 75. The liquid velocity in eductor 74 is sufficiently high to cause intimate admixing of the gas from line 75 with the liquid. The gas-liquid mixture flows through line 84 and into flotation-reactor zone 70 near the bottom. The gas bubbles pass up through the body of liquid in flotation-reaction zone 70 causing the sulfur formed by the reaction of the hydrogen sulfide with the sulfur dioxide rich absorbent to form a froth at the surface of the liquid. The gas disengages from the froth and passes to the vent through line 81 which is back pressure controlled to maintain the flotation-reaction zone under an elevated pressure.

The gas passing to the vent can be treated to remove any unreacted hydrogen sulfide before the gas is passed to the atmosphere.

The sulfur froth overflows into collection trough 94 and is removed from the system through lines 82 and 89 in the form of a slurry. Means for moving the slurry to sulfur separation means (not shown) are provided to operate in cooperation with line 89.

The absorbent in zone 70 which has had at least a portion of the sulfur dioxide reacted to sulfur passes through line 76 to pump 77 which forces the absorbent through line 78 to eductor 79.

Gas containing hydrogen sulfide enters eductor 79 through line 91 from a hydrogen sulfide source. A sufficient amount of gas must be supplied to eductor 79 to regenerate the absorbent and to effect separation of the sulfur by flotation. The intimate gas-liquid mixture passes into flotation-reaction zone 80 near the bottom. The gas bubbles react with the absorbent and float the sulfur formed to the surface of the liquid. The floating sulfur forms a froth which overflows into trough 95 and is removed from zone 80 as a slurry through line 88 and 89. A skimming means (not shown) may be utilized to effectively urge the froth from the surface of the liquid to the collection trough.

The unreacted hydrogen sulfide and non-reactive gases pass out of flotation-reactor zone 80 to eductor 74 through line 75.

The regenerated absorbent having a major portion of the sulfur separated by flotation passes out of flotation-reaction zone 80 through line 85, pump 86 and line 87. The absorbent can be pumped directly to the absorption zone, pumped to an absorption zone feed tank or treated to reduce the level of impurities such as sulfate in the absorbent.

The flows of liquids into and out of the flotation-reactor zones are usually controlled to maintain proper liquid levels in the zones to insure adequate reaction of the absorbent with hydrogen sulfide and separations of the sulfur from the absorbent.

The reaction of the sulfur dioxide in the absorbent with hydrogen sulfide and the separation of sulfur from the liquid in one step, by the process of the present invention presents a substantial savings in equipment and reduces the complexity of process operations in methods for recovering sulfur from stack gases containing sulfur dioxide.

The effectiveness of the process of the present invention will be readily apparent from the following examples:

EXAMPLE 1

An absorption column and a flotation reactor system were combined as shown in FIG. 1. A gas containing 0.3% by volume sulfur dioxide was contacted with 340 ml. per minute of an aqueous absorbent containing 1.0 molar sodium phosphate having a sodium:phosphorus ratio of 1.5 and containing 103.5 grams per liter of sodium sulfate.

The flotation-reactor was about 2.5 liters in volume and contained a Denver size D-1 flotation apparatus. The sulfur dioxide rich aqueous absorbent containing 1.6 grams per liter sulfur dioxide entered the flotation-reaction near the bottom. A gas stream, containing 60% by volume hydrogen sulfide and 40% by volume nitrogen, entered through a gas feed point in the shroud surrounding the rotating shaft of the Denver flotation apparatus, above the level of liquid in the flotation reaction zone. The hydrogen sulfide was provided in an amount sufficient to provide a mole ratio of $H_2S:SO_2$ of 2.5. The circulating aqueous absorbent was maintained at 55°C. The rotation element in the Denver D-1 unit was rotated at 1200 revolutions per minute.

The process streams had the following analyses:

TABLE 1

| Component | | Aqueous Absorbent Inlet Flotation-Reaction Zone | Aqueous Absorbent Outlet Flotation-Reaction Zone |
|---|---|---|---|
| $SO_2$ | grams/liter | 1.6 | 0.06 |
| $S_2O_3^=$ | grams/liter | 20.7 | — |
| $S_xO_6^=$ | grams/liter | 0.7 | — |
| $SO_4^=$ | grams/liter | 69.0 | — |
| Sulfur | ppm. | | 400 |

As shown by the above Table, it is possible to effectively react the $SO_2$ in the aqueous absorbent to sulfur and to remove a substantial portion of the sulfur formed from the aqueous absorbent by the one step process.

EXAMPLE 2

The apparatus of Example 1 was utilized with the same flow rates, except the concentration of hydrogen sulfide in the gas stream was reduced to 40% by volume. Poor regeneration of the absorbent occurred as evidenced by a decrease in the pH of the absorbent and the increase in the $SO_2$ loading of the aqueous absorbent leaving the flotation-reaction zone to 1.2 g/l. The rotation of the rotating element of the Denver unit was then increased from 1,200 to 2,200 revolutions per minute. The aqueous absorbent solution stabilized, the pH increased and adequate regeneration occurred. Analysis of the aqueous absorbent with the rotating element at 2,000 revolutions per minute is shown in Table 2.

TABLE 2

| Component | | Aqueous Absorbent Inlet to Flotation-Reactor Zone | Aqueous Absorbent Outlet to Flotation-Reactor Zone |
|---|---|---|---|
| $SO_2$ | grams/liter | 1.6 | 0.09 |
| $S_2O_3^=$ | grams/liter | 20.0 | — |
| $S_xO_6^=$ | grams/liter | 1.1 | — |
| $SO_4^=$ | grams/liter | 71.3 | — |

As can be seen by proper adjustment of the bubble forming apparatus, the reactivity of the system can be increased and the aqueous absorbent can be satisfactorily regenerated using a lower concentration of hydrogen sulfide in the gas stream.

The amount of sulfur which remains in the aqueous absorbent can be reduced by operating several zones in series. A system utilizing four cells operating in series produced a circulating aqueous absorbent with less than 50 ppm sulfur. The amount of sulfur in the absorbent did not rise above 100 ppm when two cells were removed from the circuit and only two cells were in operation. The combination of two or more flotation reactors operating in series can provide a circulating aqueous absorbent containing only small amounts of free sulfur.

The method is effective for reacting the sulfur dioxide in a broad range of aqueous absorbents such as solutions of alkali metal citrate, acidic aluminum sulfate, alkali metal phosphates and the like with hydrogen sulfide to form sulfur.

What is claimed is:

1. In a process for recovering sulfur in which sulfur dioxide containing gas is contacted with an aqueous absorbent to form an aqueous absorbent containing sulfur dioxide with a pH in the range of about 2.5 to about 5.0, and the aqueous absorbent containing sulfur dioxide is contacted with hydrogen sulfide to form sulfur and sulfur is separated from the aqueous absorbent, the improvement which comprises; providing a reaction-separation zone containing aqueous absorbent in the lower portion thereof and void space in the upper portion, forming a mixture of gas bubbles in the aqueous absorbent by passing a gaseous mixture containing hydrogen sulfide into a circulating zone of aqueous absorbent thereby forming a gas-liquid mixture, and passing the mixture through a zone of stationary apertures wherein the size of the gas bubbles in the mixture is reduced and whereby hydrogen sulfide in the gas is contacted with the aqueous absorbent containing sulfur dioxide to form sulfur, said gas mixture containing hydrogen sulfide is provided in an amount sufficient to react with the sulfur dioxide to form sulfur and to float the sulfur formed to the surface of the body of absorbent by the rising gas bubbles whereby the sulfur is separated from the aqueous absorbent.

2. The process of claim 1 wherein the liquid absorbent is an aqueous solution of one or more salts of substantially non-volatile acids with at least one dissociation constant between about $1 \times 10^{-1}$ and $1 \times 10^{-5}$ measured at a dilution of forty liters per gram mole at a temperature of 25°C.

3. The process of claim 1 wherein the liquid absorbent is a solution of an alkali metal salt of an acid selected from the group consisting of orthophosphoric, citric and mixtures thereof.

4. The process of claim 1 wherein the aqueous absorbent in the reaction separation zone is at a temperature between about 75° and 200°F.

* * * * *